United States Patent [19]

Kalen

[11] Patent Number: 4,693,389
[45] Date of Patent: Sep. 15, 1987

[54] REACTOR INTERNALS CORE BARREL HOLE PLUG

[75] Inventor: David D. Kalen, Lynchburg, Va.

[73] Assignee: The Babcock & Wilcox Company, New Orleans, La.

[21] Appl. No.: 823,905

[22] Filed: Jan. 31, 1986

[51] Int. Cl.[4] .................... B65D 53/00; G21C 13/00
[52] U.S. Cl. .................... 220/236; 220/315; 376/203; 376/463; 138/89; 411/21; 403/322
[58] Field of Search .......... 376/203, 204, 463, 285, 376/352; 403/330, 322; 411/21, 22, 340–346; 220/240, 325, 324, 322, 315, 327, 233–239; 138/89, 90; 277/111, 113, 142

[56] References Cited

U.S. PATENT DOCUMENTS

| | | | |
|---|---|---|---|
| 2,794,633 | 6/1957 | Delany | 403/330 |
| 2,833,522 | 5/1958 | Michaels | 403/322 |
| 3,312,138 | 4/1967 | Cumming | 411/21 |
| 4,355,917 | 10/1982 | Bunger | 403/330 |
| 4,465,039 | 8/1984 | Snelgrove et al. | 219/208 |
| 4,500,239 | 2/1985 | Liebig | 411/341 |
| 4,553,889 | 11/1985 | Le Dantec et al. | 411/21 |
| 4,584,163 | 4/1986 | Hankinson | 220/240 |
| 4,591,068 | 5/1986 | Tolino et al. | 376/203 |

Primary Examiner—Deborah L. Kyle
Assistant Examiner—Daniel Wasil
Attorney, Agent, or Firm—Robert J. Edwards; D. Neil LaHaye

[57] ABSTRACT

A core barrel hole plug. A plug body sized to easily fit the hole to be plugged is slidably attached to a flange sized larger than the hole to limit the movement of the plug body into the hole. A rectangular bore at the inner end of the plug body has a pair of pawls pivotally mounted therein which are moveable between retracted and extended positions for releasing or locking the plug in position. An actuator screw is threadably engaged through a cylindrical bore in the plug body and in communication with the rectangular bore where a cam on the actuator screw causes movement of the pawls between the release and locking positions. The flange and screw are adapted to receive a remotely operated tool for remote operation of the assembly.

6 Claims, 6 Drawing Figures

REACTOR INTERNALS CORE BARREL HOLE PLUG

BACKGROUND OF THE INVENTION

1. Field of the Invention

The present invention relates to hole plugs and in particular to plugs for holes in the core barrel of the internals of a nuclear reactor.

2. General Background

In certain nuclear reactors such as the PGE Trojan Reactor the core barrel is provided with holes in accordance with the design thereof. Holes in the core may be plugged when it is desired to modify the design. To limit exposure to the radioactivity of the core, it is preferable to utilize plugs which may be remotely installed and removed.

Several plugs exist in the known art.

U.S. Pat. No. 4,465,039 entitled "Engine Block Heater With Expansion Yoke" teaches an engine block heater adapted for insertion in the block of an engine. A pressure bar threaded onto a screw in the plug has winged members hingedly mounted thereon for contacting the inner face of the block to retain the plug in position.

U.S. Pat. No. 4,175,229 entitled "Engine Block Heater" teaches an engine jacket heater utilizing winged members and a clamp engaged with a screw for spreading the wing members into engagement with the engine jacket.

U.S. Pat. No. 4,485,771 entitled "Engine Block Heater Having Flexible Clamping Member" teaches a flexible bar and rigid member on a screw of the assembly for engaging the engine block.

U.S. Pat. No. 135,822 and 969,881 teach locking caps with pivotally mounted locking members which bear against the walls of the bore being covered.

U.S. Pat. Nos. 4,461,597 entitled "Valve Box Cover", 4,242,564 entitled "Frost Plug Immersion Heater and Improved Clamping Structure", 4,480,604 entitled "Engine Block Heater", and 3,010,694 entitled "Conduit Plug and Coupling Assembly" teach covers and plugs similar to the above and are representative of the art.

The above known art does not solve the problem of providing a plug capable of being remotely installed and removed which can withstand the severe operating conditions encountered in a nuclear reactor.

SUMMARY OF THE INVENTION

The present invention solves the above problems in a simple and straightforward manner. What is provided is a hole plug handled by a long handle tool having a fork that fits groove in a flange of the plug and a spring loaded hex drive with a right angle geared extension up the handle to the operator position. The plug assembly has a square flange contoured to fit the outside radius of the core barrel. The plug body is sized approximately 1/32 of an inch under the hole size and slidably attached to the flange by guide pins. The plug body has a rectangular aperture sized to accept pawls which are used to secure the plug in its installed position. The plug body also has a threaded aperture along its longitudinal axis on its outer end adjacent the flange in communication with the rectangular aperture. An actuator screw is threadably engaged through the threaded aperture and in communication with the rectangular aperture and pawls so that movement of the actuator screw causes extension or retraction of the pawls for installation or removal of the plug assembly.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
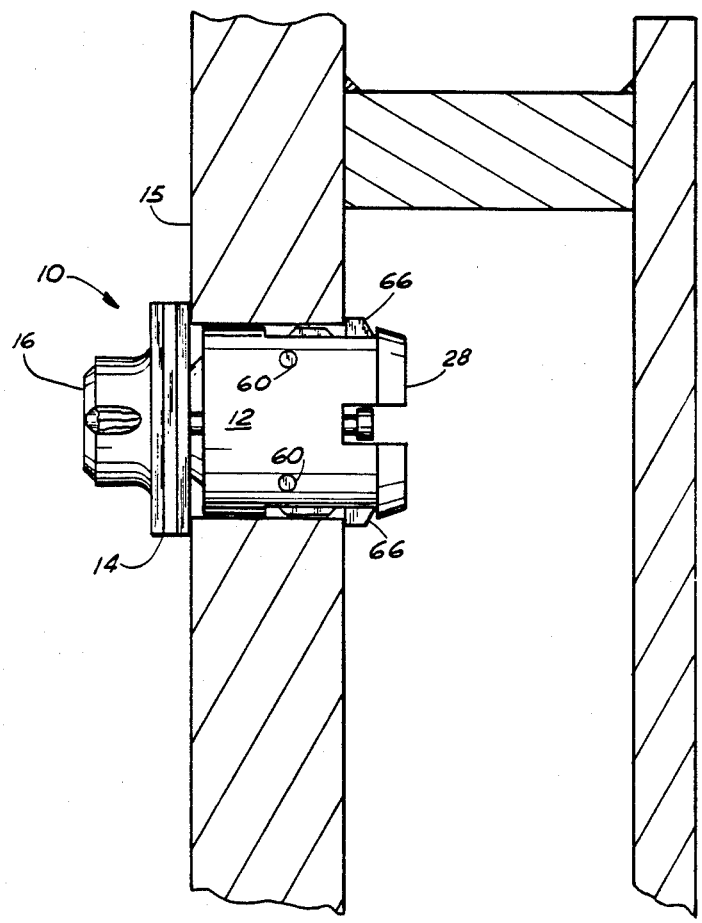
FIG. 1 is a side view which illustrates the invention as it appears installed in a core barrel wall.

Referring now to the drawings, it can be seen that the plug is generally indicated by the numeral 10. Plug 10 is generally comprised of plug body 12, flange 14, actuator screw 16, and pawls 18.

Figure 5:
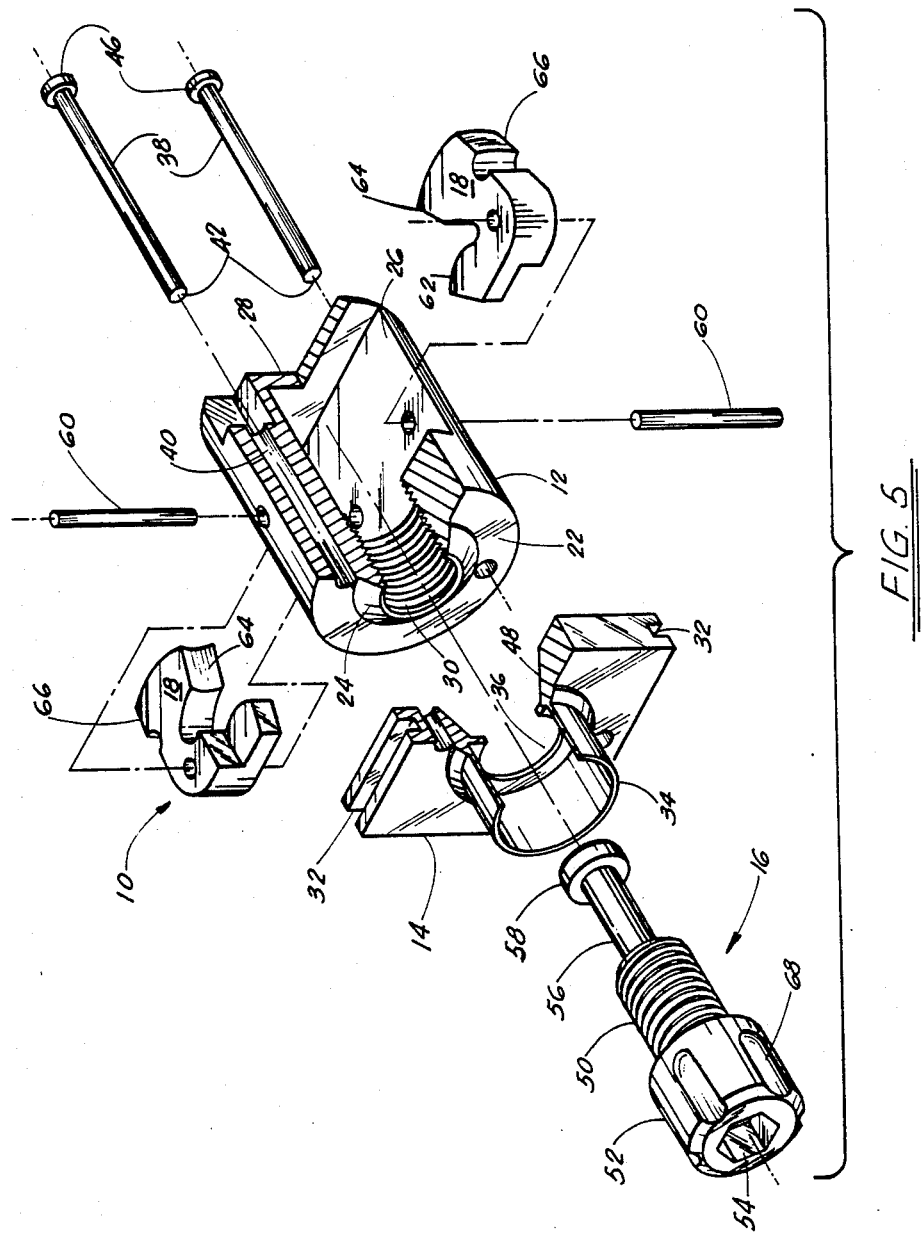
FIG. 5 is an exploded view of the invention.

Plug body may be cylindrical, square, or rectangular in cross section across its midsection 20 depending on the shape of the hole to be plugged. Plug body 12 is preferably sized so as to have an outer diameter at its midsection 20 of approximately 1/32 of an inch less than the diameter of the hole to be plugged for ease of installation. Plug body 12 is provided with a first outer end 22 which has a tapered neck portion 24 protruding outwardly therefrom in a substantially frusto-conical shape. Plug body 12 has a rectangular bore 26 transverse its longitudinal axis adjacent its second inner end 28. Rectangular bore 26 extends through the sides to form two openings to allow placement of pawls 18 therein, to be further explained. A threaded substantially cylindrical bore 30 is provided along the center of the longitudinal axis of plug body 12 starting at first outer end 22 and through plug body 12 so as to be in communication with rectangular bore 26. best illustrated in FIGS. 2, 3, and 5. Actuator screw 16, to be more fully explained, is threadably engaged in cylindrical bore 30 for causing extension and retraction of pawls 18.

Flange 14 is preferably square and sized to have a width larger than the width or diameter of plug body 12 to ensure that flange 14 completely covers the hole to be plugged. Flange 14 is also preferably contoured on its inner edge to conform to the outer surface of core barrel 15 to provide the best possible seal. Flange 14 is provided with slots 32 around its outer edge which serve as handling grooves or means for a remotely operated tool to grasp flange 14. The remotely operated tool may have a forked end. Flange 14 has a sleeve 34 attached to the outer end thereof which may be welded or be an integral portion of flange 14. Flange 14 and sleeve 34 have a bore 36 therethrough for accepting actuator screw 16 in coaxial alignment with cylindrical bore 30 when plug body 12 and flange 14 are joined together.

Figure 2:
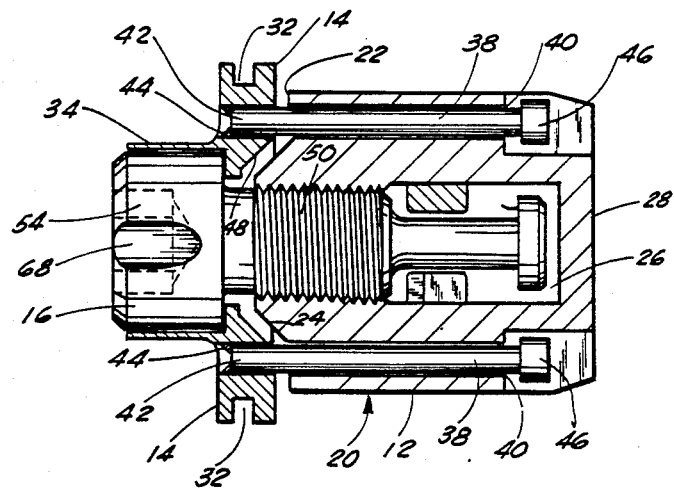
FIG. 2 is a cross sectional view of the invention along its longitudinal axis illustrating the attachment of the plug body and the flange by the guide pins.

As best seen in FIG. 2, plug body 12 and flange 14 are slidably engaged together by guide pins 38. Guide pins 38 are received by longitudinal bores 40 adjacent the exterior edges of plug body 12 for sliding engagement of plug body 12 along guide pins 38. The first end 42 of guide pins 38 are fixedly attached to flange 14 in bores 44 provided by any suitable means such as welding. Enlarged heads 46 are provided on the opposite ends of pins 38 to prevent plug body 12 from sliding off of pins 38. Flange 14 is provided with recess 48 on its inner surface which conforms to the shape of neck portion 24.

After plug body 12 and flange 14 are attached by guide pins 38, actuator screw 16, provided with threads at its midsection 50, is inserted through bore 36 and threadably engaged with plug body 12 through cylindrical bore 30 and into communication with rectangular bore 26. As illustrated in FIG. 2, actuator screw 16 has head 52 sized to fit within sleeve 34 and with means 54 such as a hexagonal bore for receiving the driving portion of a remotely operated tool. Actuator screw 16 has a reduced circumference as indicated at section 56 and means 58 at the inner end for causing extension or retraction of pawls 18 such as a cam or enlarged head.

Figure 4:
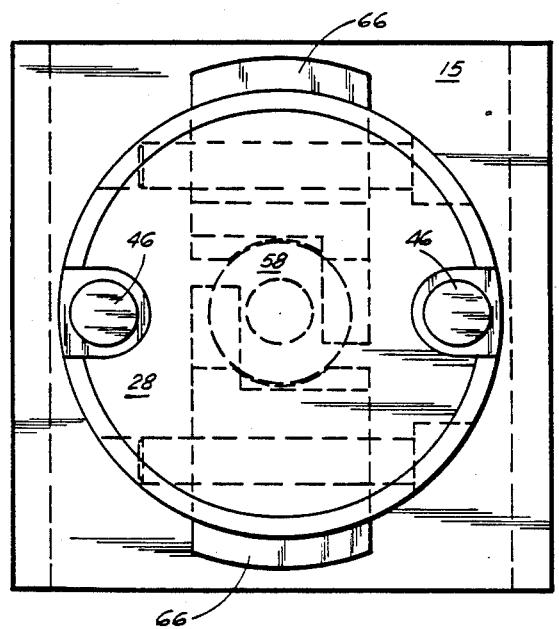
FIG. 4 is an end view of the invention from the interior of the core barrel with the pawls extended.
Figure 3A:
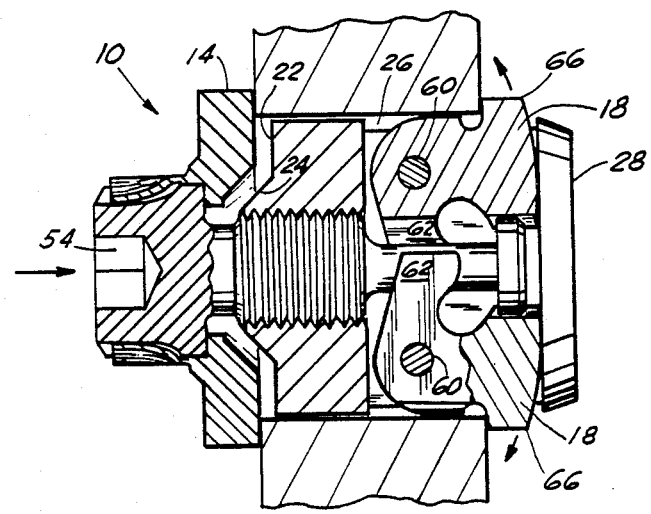
FIGS. 3 a, b are cross sectional views of the invention along its longitudinal axis rotated approximately 90° to that of FIG. 2 illustrating the pawls in the extended and retracted positions.
Figure 3B:
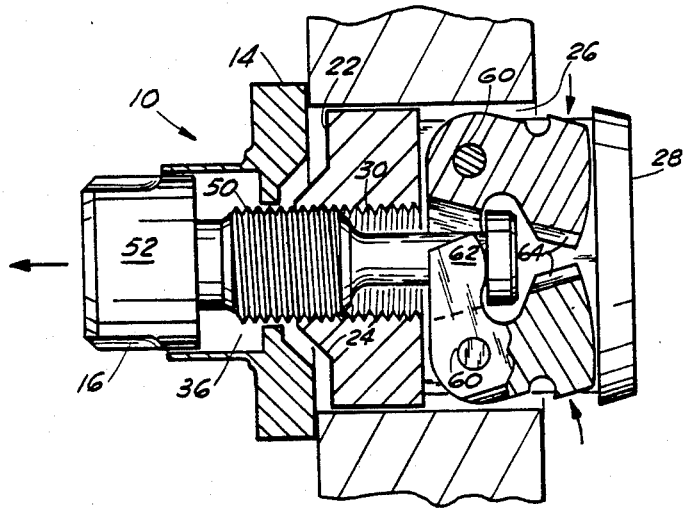

Referring now to FIG. 3, pawls 18 are inserted into rectangular bore 26 and pivotally mounted therein by means of pivot pins 60 as to be moveable between a first release or retracted position and a second locking or extended position. Pivot pins 60 are received by bores provided in pawls 18 and plug body 12. Pawls 18 have an oblong slot along their inner surfaces to form retraction and extension surfaces 62 and 64 respectively which interact with means 58 of actuator screw 16 to cause retraction or extension of pawls 18 in response to lateral movement of actuator screw 16 within plug body 12. When pawls 18 are extended, locking arms 66 engage the inner surface of core barrel 15, illustrated in FIGS. 1, 3A, and 4 to retain plug 10 in its installed position. FIG. 3A illustrates pawl 18 in the extended and locked position and FIG. 3B illustrates pawl 18 in the retracted and released positiion to show the interaction between actuator screw 16 and pawls 18. It can also be seen that pawls 18 serve to capture actuator screw 16 in plug body 12 once installed.

In operation, plug 10 is prepared for installation by backing out actuator screw 16 to its full travel and thereby retracting pawls 18. Plug 10 is then attached to a remote operating tool by means of slots 32 with the drive member of the tool engaged with means 54 for accepting the drive. The force from the drive member of the tool on actuator screw 16 causes plug body 12 to be extended to heads 46 of guide pins 38. Plug body 12 is inserted into the hole in core barrel 15 until flange 14 is seated against the outer wall thereof. Actuator screw 16 is then rotated and caused to be driven inward of plug body 12, causing extension of pawls 18 and locking arms 66 into engagment with the inner surface of the core barrel 15. At the same time, plug body 12 is retracted toward flange 14 by pressure from pawls 18 as they seat on the inner edge of rectangular bore 26. Pawls 18 are preferably sized and shaped so that their ends bear on the inner edge of rectangular bore 26, thereby causing the final loading to be carried by the end wall of plug body 12 and not pivot pins 60. To provide a means for locking actuator screw 16 into position, head 52 may have a fluted surface 68 on its outer surface as indicated so that sleeve 34 may be swaged into one or more of fluted surfaces 68. To remove plug 10, the remote tool is engaged with flange 14 and actuator screw 16 as described above. Sufficient torque is then applied to unswage sleeve 34 and back out actuator screw 16, causing retraction of pawls 18 and enabling plug 10 to be removed.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A plug for insertion into reactor core barrel holes, comprising:
   a. a plug body having inner and outer ends, said plug body being of a size to closely fit the hole to be plugged and having a rectangular bore adjacent its inner end and a substantially cylindrical bore along its longitudinal axis at its outer end in communication with said rectangular bore;
   b. a flange sized larger than the hole to be plugged attached to said plug body and having pins mounted thereon for slidably receiving said plug body adjacent the outer end of said plug body to limit the movement of said plug body into the hole to be plugged, said flange being contoured to the surface of the core barrel to be plugged;
   c. a pawl pivotally mounted in said rectangular bore and moveable between first retracted release position and a second extended locking position; and
   d. an actuator screw threadably engaged in said cylindrical bore and in communication with said rectangular bore and having a cam in communication with said pawl for moving said pawl between said first and second positions.

2. The plug of claim 1 wherein said flange and said actuator screw for moving said pawl are adapted for receiving a remotely operated tool for remotely installing or removing said device.

3. The plug of claim 1 wherein said plug body is sized 1/32 of an inch less than the hole to be plugged.

4. A plug for insertion into reactor core barrel holes, comprising:
   a. a plug body having inner and outer ends, said plug body being of a size to closely fit the hole to be plugged and having a rectangular bore adjacent its inner end and a substantially cylindrical bore along its longitudinal axis at its outer end in communication with said rectangular bore;
   b. a flange sized larger than the hole to be plugged attached to said plug body and having pins mounted thereon for slidably receiving said plug body adjacent its outer end to limit the movement of said plug body into the hole to be plugged, said flange being contoured to the surface of the core barrel to be plugged;
   c. at least two pawls pivotally mounted in said rectangular bore and moveable between a first retracted release position and a second extended locking position;
   d. an actuator screw threadably engaged in said cylindrical bore and having a cam member at the end in communication with said rectangular bore for moving said pawls between said first and second positions in response to movement of said screw within said bores and a head which extends through said flange; said actuator screw having a fluted surface on the outer diameter of its head; and a sleeve attached to said flange and surrounding the head of said actuator screw which may be swaged into the fluted surface of said actuator screw, thereby securing said actuator screw and pawls in the extended locking position.

5. The plug of claim 4 wherein said plug body is sized 1/32 of an inch less than the hole to be plugged.

6. The plug of claim 4 wherein said flange and said actuator screw are adapted for receiving operated tool for remotely installing or removing said device.

* * * * *